US012269720B2

(12) United States Patent
Le Polotec et al.

(10) Patent No.: US 12,269,720 B2
(45) Date of Patent: *Apr. 8, 2025

(54) UNMANNED GROUND-BASED TRANSPORT VEHICLE AND METHOD FOR TRANSPORTING ITEMS

(71) Applicants: AIRBUS OPERATIONS GMBH, Hamburg (DE); CAPGEMINI ENGINEERING DEUTSCHLAND S.A.S. & CO. KG, Munich (DE)

(72) Inventors: Christian Le Polotec, Hamburg (DE); Thomas Stopp, Heidgraben (DE); Matthias Kossow, Munich (DE)

(73) Assignees: Airbus Operations GmbH, Hamburg (DE); Capgemini Engineering Deutschland S.A.S. & Co. KG, Munich (DE)

( * ) Notice: Subject to any disclaimer, the term of this patent is extended or adjusted under 35 U.S.C. 154(b) by 631 days.

This patent is subject to a terminal disclaimer.

(21) Appl. No.: 17/412,983

(22) Filed: Aug. 26, 2021

(65) Prior Publication Data
US 2022/0024738 A1 Jan. 27, 2022

Related U.S. Application Data

(63) Continuation of application No. PCT/EP2020/054990, filed on Feb. 26, 2020.

(30) Foreign Application Priority Data

Feb. 26, 2019 (DE) ...................... 10 2019 202 558.7
Sep. 13, 2019 (DE) ...................... 10 2019 124 706.3

(51) Int. Cl.
*B66F 9/06* (2006.01)
*B60G 17/017* (2006.01)
(Continued)

(52) U.S. Cl.
CPC ............ *B66F 9/063* (2013.01); *B60G 17/017* (2013.01); *B60L 53/14* (2019.02); *B60P 1/00* (2013.01);
(Continued)

(58) Field of Classification Search
CPC .......... B66F 9/063; B66F 9/24; B66F 9/0755; B64F 5/50; B60W 60/00256;
(Continued)

(56) References Cited

U.S. PATENT DOCUMENTS 6,104,314 A 8/2000 Jiang
9,149,549 B2 10/2015 Kreitenberg
(Continued)

FOREIGN PATENT DOCUMENTS

CA 3 089 452 A1 8/2019
CN 108946586 A 12/2018
(Continued)

OTHER PUBLICATIONS

WLUK-TV Fox 11, GDW7TUE Police Car Computers SOT, May 14, 2013, YouTube, https://www.youtube.com/watch?v=6SrPriJBOYs (Year: 2013).*
(Continued)

*Primary Examiner* — Yufeng Zhang
(74) *Attorney, Agent, or Firm* — KDW Firm PLLC

(57) ABSTRACT

An unmanned ground-based transport vehicle, UGV, includes a housing, having a base plate and at least one housing side wall substantially perpendicular to the base plate. Arranged in the housing is at least one wheel drive, which is coupled to at least one wheel. The wheel is arranged in a recess in the base plate. The UGV further includes sensors for sensing the environment of the UGV, and a controller for autonomous location and navigation of the UGV on the basis of sensing parameters of the sensors. The UGV includes at least one load-receiving element coupled to the housing side wall and extending outwards from the housing side wall, wherein the load-receiving element includes a load support surface for supporting an item with respect to a vertical direction which extends transverse to the base plate.

18 Claims, 10 Drawing Sheets

(51) Int. Cl.
  *B60L 53/14*  (2019.01)
  *B60P 1/00*  (2006.01)
  *B60P 3/42*  (2006.01)
  *B60W 60/00*  (2020.01)
  *B64F 5/50*  (2017.01)
  *B66F 9/075*  (2006.01)
  *B66F 9/24*  (2006.01)
  *G05D 1/00*  (2006.01)
  *B60B 19/00*  (2006.01)
  *B60P 3/11*  (2006.01)

(52) U.S. Cl.
  CPC ......... *B60P 3/42* (2013.01); *B60W 60/00256* (2020.02); *B64F 5/50* (2017.01); *B66F 9/0755* (2013.01); *B66F 9/24* (2013.01); *G05D 1/0295* (2013.01); *B60B 19/003* (2013.01); *B60G 2500/30* (2013.01); *B60P 3/11* (2013.01); *B60W 2556/65* (2020.02)

(58) Field of Classification Search
  CPC ................ B60W 2556/65; B60L 53/14; B60G 17/017; B60G 2500/30; B60B 19/003; B60P 1/00; B60P 3/42; B60P 3/11; G05D 2201/0216; G05D 1/0295
  See application file for complete search history.

(56) References Cited

U.S. PATENT DOCUMENTS

| | | |
|---|---|---|
| 2010/0030382 A1 | 2/2010 | Shalat et al. |
| 2010/0300837 A1 | 12/2010 | Kosuge et al. |
| 2012/0039693 A1* | 2/2012 | Benedict ................ E04H 6/225 414/807 |
| 2014/0172223 A1 | 6/2014 | Murphy |
| 2014/0365258 A1 | 12/2014 | Vestal et al. |
| 2016/0368149 A1 | 12/2016 | Inaba et al. |
| 2017/0072565 A1* | 3/2017 | Egerstedt ............. G05D 1/0027 |
| 2017/0308084 A1 | 10/2017 | Spicer et al. |
| 2019/0001824 A1* | 1/2019 | Lu ......................... F24S 25/634 |
| 2019/0242916 A1 | 8/2019 | Guarracina et al. |
| 2019/0314993 A1 | 10/2019 | Orr |
| 2020/0122321 A1* | 4/2020 | Khansari Zadeh .... B25J 9/1664 |
| 2021/0232148 A1* | 7/2021 | Sui ......................... B66F 9/063 |
| 2022/0031895 A1 | 2/2022 | Le Polotec |

FOREIGN PATENT DOCUMENTS

| | | |
|---|---|---|
| CN | 209 758 195 U | 12/2019 |
| DE | 102013016381 A1 | 4/2015 |
| DE | 10196992 B4 | 9/2016 |
| DE | 10 20171080148 A1 | 10/2017 |
| EP | 3094796 B1 | 11/2016 |
| JP | 2007111826 A | 5/2007 |
| WO | WO 2014/007729 A1 | 1/2014 |
| WO | WO 2020/173982 A1 | 9/2020 |

OTHER PUBLICATIONS

International Search Report and Written Opinion for Application No. PCT/EP2020/054990 dated Jul. 7, 2020.
European Search Report for Application No. 23154479 dated Mar. 3, 2023.
German Search Report for Application No. 102019202558 dated Dec. 4, 2019.
European Office Action for Application No. 2186293 dated Dec. 20, 2021.
Machine Translation of Japanese Office Action for Application No. 2021549912 dated Sep. 26, 2023.
European Office Action in EP Application No. 23154471.9, dated Sep. 16, 2024, 3 pages.

* cited by examiner

UNMANNED GROUND-BASED TRANSPORT VEHICLE AND METHOD FOR TRANSPORTING ITEMS

CROSS-REFERENCE TO RELATED APPLICATIONS

This application is a continuation of and claims priority to PCT/EP2020/054990 filed Feb. 26, 2020, which claims priority to German Patent Application No. 10 2019 202 558.7 filed Feb. 26, 2019 and German Patent Application No. 10 2019 124 706.3 filed Sep. 13, 2019, the entire disclosures of which are incorporated herein by reference.

TECHNICAL FIELD

The disclosure herein relates to an unmanned ground-based transport vehicle, a cooperatively acting swarm of unmanned ground-based transport vehicles, and a method for transporting items, for example cabin monuments for aircrafts, in particular using a cooperatively acting swarm of unmanned ground-based transport vehicles.

Although applicable for any kind of transport tasks or assembly processes, the disclosure herein and the corresponding underlying concepts and challenges will be explained in further detail mainly in conjunction with an assembly process of an aircraft.

BACKGROUND

When monuments are being installed inside an aircraft fuselage in a final assembly line (FAL), large loads have to be maneuvered and positioned with precision under cramped conditions. Human workers can only move these large loads under difficult, potentially dangerous and largely unergonomic working conditions. Technical auxiliary systems such as exoskeletons or autonomous ground vehicles (AGVs) are known from the prior art.

For example, US 2010/0300837 A1 discloses an object moving apparatus having a plurality of wirelessly communicating carriages, which can move an object by coordinated control of the carriages without the object falling off. JP 2007-111826 A discloses a cooperative transport system of a plurality of communicating robot arms.

DE 10 2017 108 148 A1 discloses a driverless transport system having a plurality of driverless transport vehicles that are arranged in a predefined relationship to each other for the purpose of carrying a load. Each of the driverless transport vehicles has a plurality of rollers, and at least one positioning element for engaging in the load. Each of the driverless transport vehicles has an on-board controller, one of the driverless transport vehicles acting as a master, and the rest of the transport vehicles acting as slaves.

There is therefore a fundamental need for flexible and adaptive solutions for the unmanned, automatic transport of items in production or assembly lines, in particular for automatic transport of aircraft cabin monuments in a final assembly line, that can be implemented at low cost and that ensure good maneuverability of the cabin monuments to be transported in a confined space.

SUMMARY

One of the objects of this disclosure is therefore to find improved solutions for technical auxiliary systems in the transporting of items, in particular in the transporting of cabin monuments in a final assembly line (FAL).

This and other objects are achieved by an unmanned ground-based transport vehicle (UGV), by a swarm of unmanned ground-based transport vehicles (UGVs), and by a method for transporting items by a swarm of unmanned ground-based transport vehicles (UGVs) having features disclosed herein.

According to a first aspect of the disclosure herein, an unmanned ground-based transport vehicle (UGV) comprises a housing, having a base plate and at least one housing side wall that is substantially perpendicular to the base plate. Arranged in the housing is at least one wheel drive, which is coupled to at least one wheel, in particular an omnidirectional wheel. The omnidirectional wheel may for example be realized as a Mecanum wheel. The at least one wheel is arranged in a recess in the base plate. The UGV comprises a plurality of sensors for sensing the environment of the UGV, and a controller for autonomous location, navigation and collision avoidance of the UGV on the basis of sensing parameters of the plurality of sensors. The UGV further comprises at least one load-receiving element that is coupled to the housing side wall and extends outwards from the housing side wall. The at least one load-receiving element comprises a load support surface for supporting an item with respect to a vertical direction which extends transverse to the base plate According to a second aspect of the disclosure herein, a swarm of unmanned ground-based transport vehicles (UGVs) comprises a plurality of UGVs according to the first aspect of the disclosure herein, one of the plurality of UGVs performing the role of a lead vehicle, and the controller of the lead vehicle being connected to the controllers of the rest of the plurality of UGVs via wireless communication, and being designed to control the movements of the rest of the plurality of UGVs. Within the meaning of the disclosure herein, "control" also means coordinating the joint movement of the UGVs.

According to a third aspect of the disclosure herein, a method for transporting items, e.g. cabin monuments for an aircraft, in particular by using a cooperatively acting swarm of unmanned ground-based transport vehicles (UGVs) such as, for example, according to the second aspect of the disclosure herein, comprises the steps of distributing at least two UGVs according to the first aspect of the disclosure herein around an outer circumference of the item, raising the item by using the load-receiving elements of the UGVs, and moving the raised item by cooperatively controlling the omnidirectional wheels of the at least two UGVs. Preferably, at least three UGVs may be used to transport a monument. For example, the method according to the third aspect of the disclosure herein may be used to transport monuments such as, for instance, toilet assemblies, passenger seat assemblies, galleys, or other types of cabin monuments. Furthermore, the term monuments is not to be interpreted in a restrictive manner. For example, transport boxes, transport racks or any kind of container may also be transported by the ground-based transport vehicles. The term monument may also be understood as a freight container to be transported in the cargo hold of an aircraft.

One of the concepts of the disclosure herein is to use autonomously acting transport vehicles having omnidirectional mobility in order to apply local lifting forces at various points on the outside of a load to be transported, such as, for instance, a cabin monument, in the final assembly line of an aircraft assembly. The load to be transported is thus carried by the transport vehicles, with one of the transport vehicles acting as a master vehicle, controlling or managing the movements and functionality of the other transport vehicles in order to transfer the load to be transported to an assembly position in a controlled manner.

Due to their low unladen weight and compact design, the UGVs can be used in confined environments such as an aircraft final assembly line. The UGVs have the advantage of excellent maneuverability, and can therefore provide valuable support for human workers. Due to the modular implementation of cargo interfaces and tool interfaces, the UGVs can be made suitable, in an adaptive and highly flexible manner, for a very wide range of transport conditions. It is thus also possible to implement a single transport system, based on such UGVs, in the entire final assembly line. This allows a cost-efficient implementation of a technical assistance system without transfer points or interfaces with other transport systems.

Advantageously, the UGVs may be built in such a way that the cargo itself, i.e. for example the cabin monuments to be transported, serves as a stabilizing frame. This enables the UGVs to be of a light and compact construction. In particular, if they are designed with omnidirectional wheels or Mecanum wheels or travel/turn modules—both of which require a complex drive and therefore have a high unladen weight—it is sufficient to provide only one omnidirectional wheel or Mecanum wheel or travel/turn module per UGV, even if a UGV having only one omnidirectional wheel or travel/turn module would not be stable enough to travel on its own. When a cargo is received by a plurality of such UGVs that each have only one omnidirectional wheel or travel/turn module, travel stability is provided by the cargo itself, since the transporting UGVs can be distributed more or less uniformly around the outer circumference of the cargo.

In another advantageous embodiment, the loads of the item to be transported can be transferred to the transport surface, on which the UGV drives, not only via a single wheel of the UGV, but via a plurality of wheels, and thus a plurality of load application points. This can be advantageous, in particular, if the transport surface is sensitive to high loads. For example, a floor plate of a vehicle, in particular of an aircraft, should not be subjected to excessive loads. Thus, a load per area is advantageously reduced, in particular, when specific threshold values are prescribed or when particular sensitive transport surfaces are provided. For example, a load per area may be reduced to 25 kg per $cm^2$ or below. Of course, the disclosure herein is not limited to a threshold of 25 kg per $cm^2$. Besides providing the UGV with multiple wheels, the load per area may also be reduced by cooperatively using multiple UGVs that cooperatively carry the item to be transported.

When the UGV comprises exactly one wheel, the stabilization of the UGVs by the cargo or item is achieved in that the UGVs can receive the cargo at load-bearing elements arranged on a side wall of their housing. Irrespective of the number of wheels of the UGV, in comparison with receiving of a load on the top side, the running and maneuvering characteristics of the UGVs are thus significantly improved by providing the load-bearing or load-receiving elements on the side wall. In addition, it is also possible to receive cargo that is standing on the ground and that cannot be lifted in any other way. In the case of UGVs that have to receive the load on the top side, either only loads that have a freely accessible space on their underside can be received, or an additional lifting system, which places the loads on the top side of the UGVs, is required. Both of these limiting constraints are advantageously eliminated by the UGVs according to the disclosure herein.

The UGVs can form between them an ad-hoc network based on a wireless communication protocol, such that the number of UGVs can be increased or decreased dynamically and without specific modification, depending on the currently prevailing transport conditions. The UGVs themselves do not need to be reprogrammed or specially modified for this purpose, as a standardized and harmonized interface architecture is provided.

A great advantage of the UGVs is their high load-bearing capacity when lifting large loads in a small space. Because of the integrated lifting mechanism, in combination with the fact that the load is received laterally, on the side of the housing, the positioning of items to be transported, such as aircraft cabin monuments, can be adjusted very precisely by the UGVs.

According to some embodiments of the UGV according to the disclosure herein the at least one load-receiving element may extend substantially parallel to the base plate. For example, the load-receiving element may also be substantially plate shaped. Optionally, the load support surface of the load receiving element may be planar. Further optionally, the load support surface may extend substantially parallel to the base plate, too. Other shapes or configurations of the load-receiving element are possible. For example, the load support surface may be curved, e.g. concave to receive pipes or similar, V-shaped, or similar.

According to some embodiments of the UGV according to the disclosure herein the at least one load-receiving element may be coupled to the housing side wall so as to be stationary relative to the base plate, at least with respect to the vertical direction. Optionally, the load-receiving element may be coupled to the housing side wall so as to be stationary relative to the base plate in all directions. That is, when lifting an item, the load-receiving element remains stationary relative to the housing of the UGV while the at least one wheel of the UGV is deflected relative to the base plate. Consequently, relative movement between the housing and the item to be lifted can be prevented, whereby damage of the item or losing the item can be more reliably prevented.

According to some embodiments of the UGV according to the disclosure herein the at least one load-receiving element may be detachably coupled to the housing side wall. Thus, various load-receiving elements, which may, for example, have support surfaces of different shapes, may be easily coupled to the housing side wall. Generally, the housing side wall may comprise a mechanical coupling interface configured to detachably couple at least one load-receiving element to the housing side wall.

According to some embodiments of the UGV according to the disclosure herein, the at least one housing side wall may have at least one T-profile or dovetail groove as a mechanical coupling interface, which extends parallel to the base plate and in which a T-profile or dovetail tongue rail of the at least one load-receiving element can be engaged in a form-fitting manner. Such a design allows different types of load-receiving elements to be exchanged quickly and without special tools, depending on the cargo to be transported. Because of the T-profile or dovetail architecture of the load-receiving element interface, the load-bearing capacity of the load-receiving elements is particularly high.

According to some further embodiments of the UGV according to the disclosure herein, a tool carrier, having an electrical tool connection, may be arranged in the at least one housing side wall. In some embodiments, in this case an electrically operable suction pad may be connected to the electrical tool connection. Electrically operable suction pads can be applied to outer walls of the cabin monuments to prevent the cabin monuments from slipping off the load-receiving elements.

According to some further embodiments of the UGV according to the disclosure herein, the UGV may comprise exactly one wheel, which is coupled to the wheel drive and arranged in the recess in the base plate. Thereby, a light-weight UGV is provided with a low number of components. Further embodiments of the UGV according to the disclosure herein may be equipped with exactly four wheels, which are coupled to four wheel drives and arranged in a recess in the base plate. By providing more than one wheel, the pressure applied to the transport surface on which the wheels roll can be advantageously decreased. By providing exactly four wheels a highly stable stand of the UGV and improved traction can be achieved.

According to some other embodiments of the UGV according to the disclosure herein, the wheel drive of the UGVs may comprise at least one wheel suspension and at least one lifting motor. Each wheel may be suspended on one wheel suspension and at least one lifting motor may be provided for or coupled to each wheel. In particular, each lifting motor may be kinematically coupled to one wheel so as to deflect the wheel relative to the housing in the vertical direction. According to some embodiments, at least two lifting motors serve to deflect the wheel suspension relative to the housing in a direction perpendicular to the floor plate. Generally, the lifting motors allow the wheel to be extended in a controlled manner through the recess in the base plate in order to raise the housing, with the received load, from the floor.

According to some further embodiments of the UGV according to the disclosure herein, the wheel suspension may comprise two wheel suspension arms, which are connected to the housing via two sawtooth-threaded rods coupled to the two lifting motors. The lifting motors can be, for example, stepper motors, which can adjust a precise lifting height of the load via the sawtooth-threaded rods. Alternatively, the lifting motors may be realized as servo motors, for example, or, generally as an electric motor. Sawtooth threads are trapezoidal threads having two differing flank angles, of 30° to 45° on the one hand, and 0° to 3° on the other hand. Such sawtooth threads can absorb high forces when loaded on the flatter thread flank and, in particular in this case, are particularly advantageous for lifting mechanisms for raising large loads in the vertical direction. The disadvantage of easier detachability is of scarcely any significance in the case of vertical lifting movements.

According to some embodiments of the UGV according to the disclosure herein, the UVG may comprise at least two wheels and an inclination sensor configured to capture an inclination of the base plate relative to a predefined reference direction, wherein the controller may be configured to control the lifting motors coupled to the wheels such that the inclination of the base plate relative to the reference direction is kept within a predefined range. The reference direction may for example be the direction of gravity or a direction perpendicular to an even region of the transport surface on which the UGV drives. By controlling the lifting motors based on the captured inclination, the base plate and, thereby, the load-receiving element can be kept in a desired, predefined orientation. For example, the predefined inclination range may include an angle range of 5 degrees relative to the reference direction. Generally, controlling the inclination of the UGV eases transportation of items over uneven regions of the transport surface and prevents the transported item from falling off of the load-receiving element.

According to some further embodiments of the UGV according to the disclosure herein, the controller may have a wireless communication module, via which the controller of one UGV can exchange data with a controller(s) of another UGV. Via the wireless communication modules, a plurality of UGVs can move a load together in a cooperative manner, in that important movement parameters of the individual UGVs can be exchanged, optionally in real time, among the group of UGVs involved in the transport. For example, if at least two UGVs are used, one lead vehicle ("master") and a plurality of follower vehicles ("slaves") can be defined. Possibly, a cooperative mode of operation may also be realized by synchronizing the system times of the individual UGVs to the master UGV and, based on this, "timing" the movements with predefined starting times. With a regular, preferably continuous synchronization, synchronicity in a millisecond range is possible. The lead vehicle in this case assumes control of the movements of the follower vehicles by wireless communication with the controller of the follower vehicles.

According to some embodiments of the Unmanned transport system according to the disclosure herein a base station including an electrical charging interface may be provided, wherein the UGVs may comprise an electrical energy storage device, for example for operating the lifting motors, the controller, the sensors and so on, and an UGV charging interface configured to be coupled to the electrical charging interface of the base station for charging the electrical energy storage device. Optionally, the electrical charging interface of the base station and the UGV charging interface may be configured for inductive charging. For example, the base station may comprise a charging interface including a charging plate and a charging inductor coil arranged beneath the charging plate or integrated into the charging plate. The UGV may comprise a receiving inductor coil arranged on or integrated into the base plate of the housing the UGV charging interface. For charging the electrical energy storage device may simply drive onto the charging plate of the base station. Thus, charging can be performed autonomously in a very simple manner.

The above designs and embodiments may be combined with each other in any appropriate manner. Further possible designs, embodiments and implementations of the disclosure herein also include combinations of features of the disclosure herein not explicitly mentioned above or described below with regard to the example embodiments. In particular, persons skilled in the art will also add individual aspects as improvements or additions to the respective basic form of the disclosure herein.

BRIEF DESCRIPTION OF THE DRAWINGS

The disclosure herein is described in greater detail in the following on the basis of the example embodiments given in the schematic figures.

Figure 1:
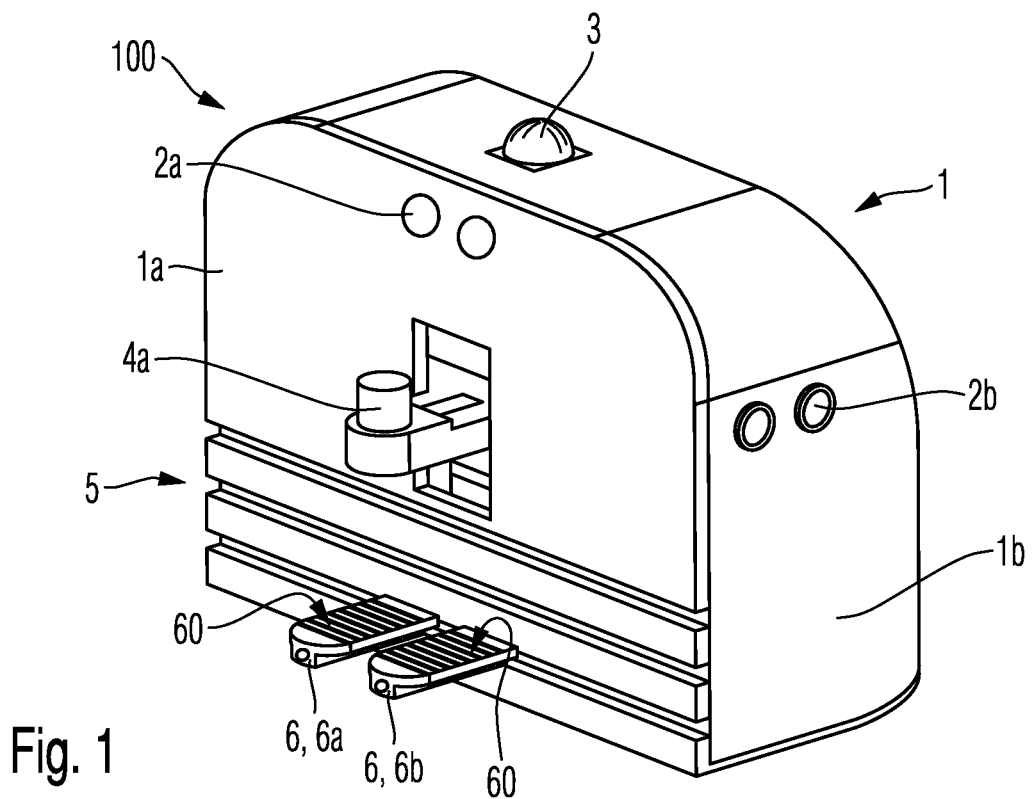
FIG. 1 shows a schematic perspective view of the exterior of an unmanned ground-based transport vehicle according to an embodiment of the disclosure herein.

The appended figures are intended to provide a further understanding of the embodiments of the disclosure herein. They illustrate embodiments and, in combination with the description, serve to explain principles and concepts of the disclosure herein. Other embodiments and many of the stated advantages are evident from the drawings. The elements of the drawings are not necessarily shown in true scale in relation to each other. Terminology indicating direction, such as "top", "bottom", "left", "right", "above", "below", "horizontal", "vertical", "front", "rear" and similar indications are used merely for explanatory purposes and are not intended to limit the universality to specific configurations as shown in the figures.

In the figures of the drawing—unless otherwise specified—elements, features and components that are identical, functionally identical and that act in an identical manner are in each cased denoted by the same reference numerals.

DETAILED DESCRIPTION

Cabin monuments, within the meaning of the disclosure herein, include all installations in aircraft passenger cabins that are intended for catering for passengers and/or their use by passengers. Such installations in an aircraft passenger cabin, such as toilet assemblies, passenger seat assemblies or galleys, are also referred to as monuments, and are supplied with water, air, electricity, data or the like at the corresponding installation position via the supply lines present in the aircraft. The functions of the cabin monuments may be routed to the monuments via various electrical data lines and/or power supply lines.

Unmanned transport vehicles, within the meaning of the disclosure herein, in this case include driverless transport vehicles which, for the purpose of transporting goods loaded on the vehicles, perform ground-based movement operations such as, for instance, changes of direction, acceleration or braking maneuvers, substantially without human involvement or intervention, for example with the aid of sensors and software, integrated in the transport vehicle, for location, navigation, obstacle detection and path planning.

Figure 3:
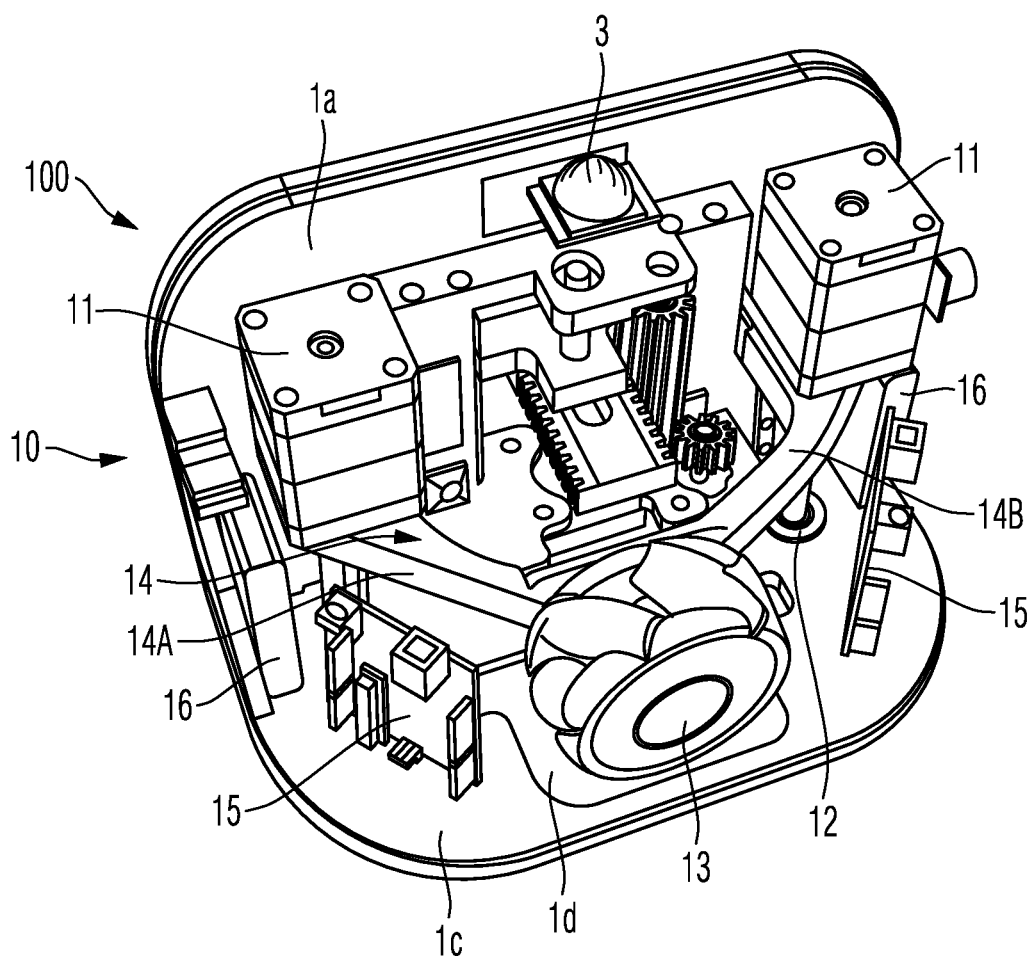
FIG. 3 shows a schematic illustration of the components present in the interior of an unmanned ground-based transport vehicle according to an embodiment of the disclosure herein.
Figure 6:
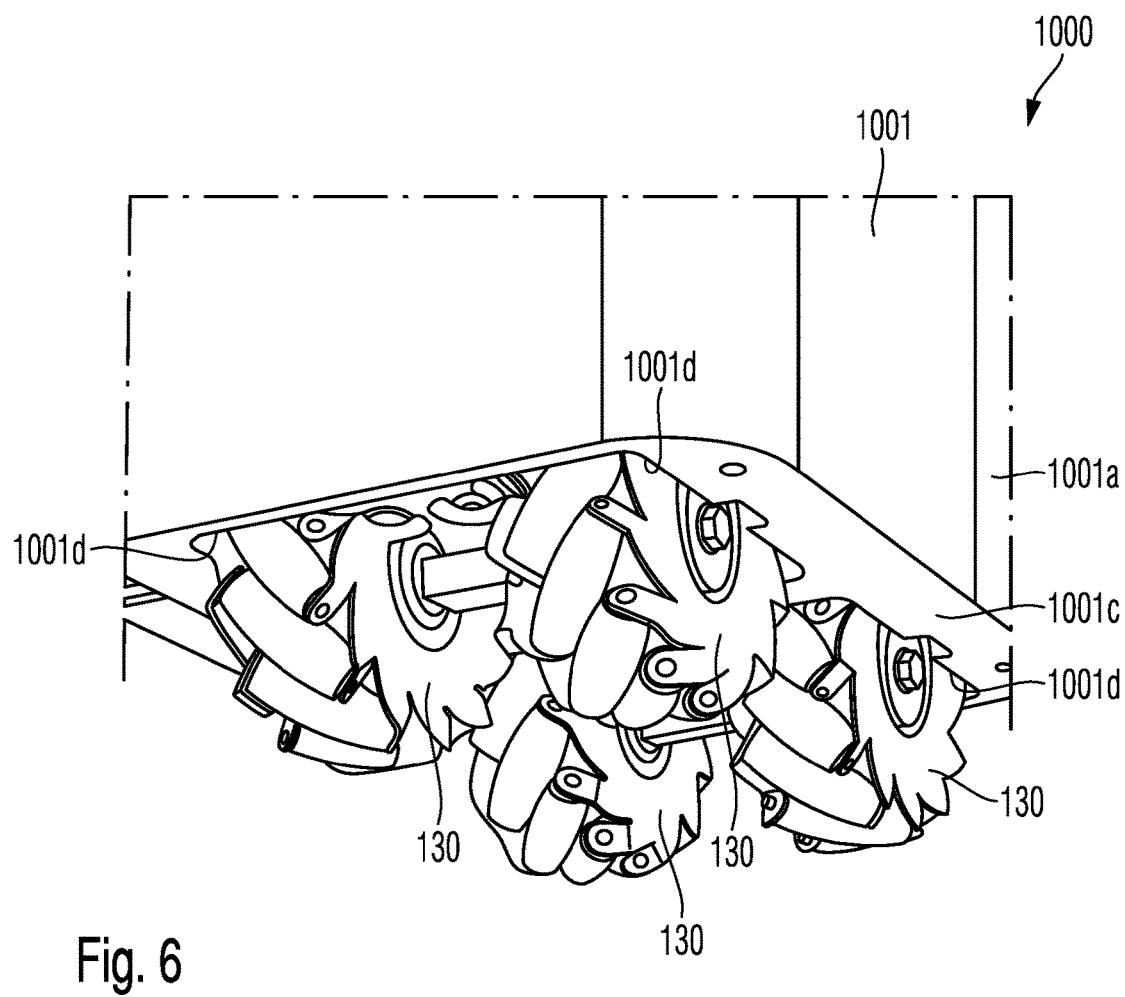
FIG. 6 shows a schematic perspective view to a base plate side of an unmanned ground-based transport vehicle according to an embodiment of the disclosure herein.
Figures 7A, 7B, 7C, 7D:
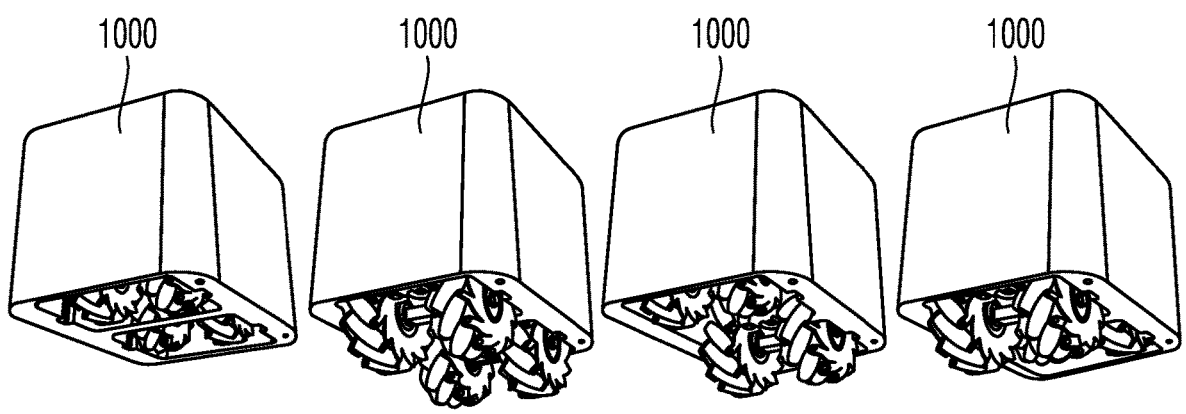
FIGS. 7A through 7D show schematic illustrations of four operating states of the unmanned ground-based transport vehicle of FIG. 6 during the raising and transporting of loads to be transported.
Figure 8:
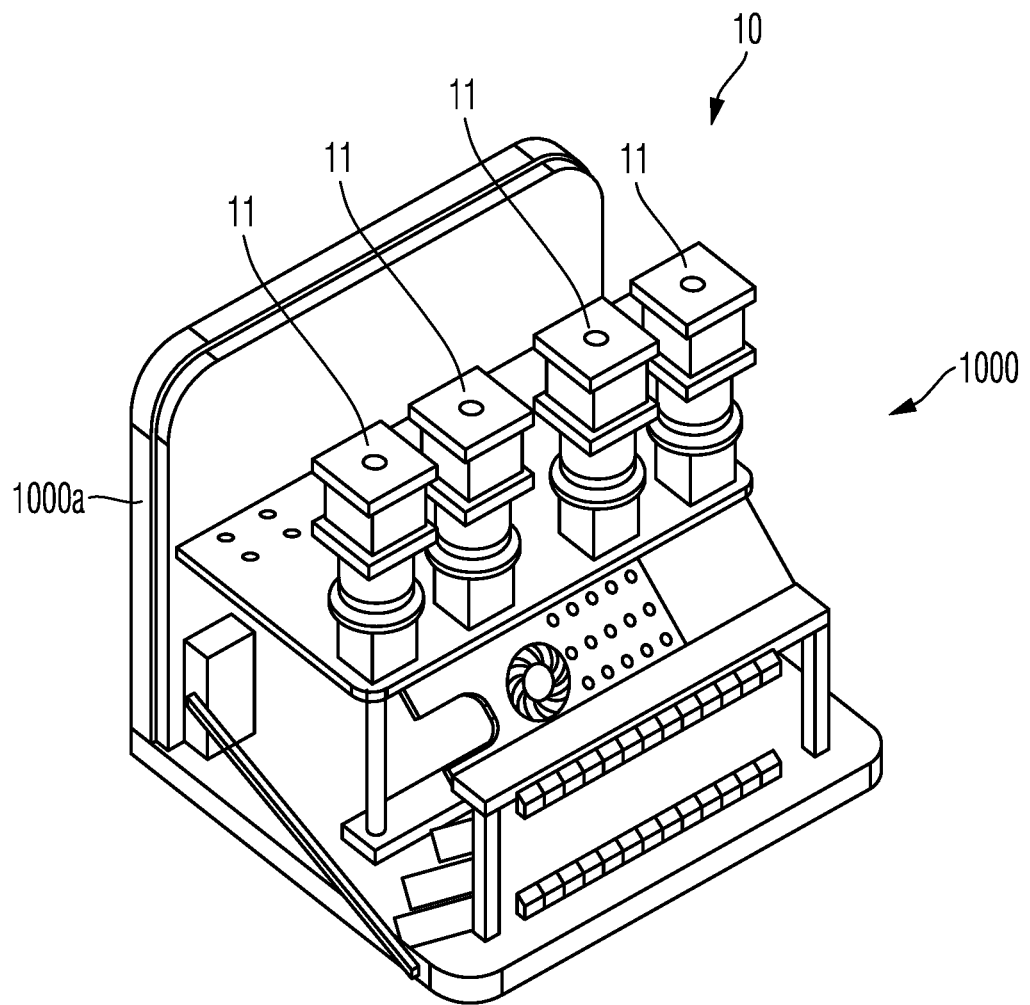
FIG. 8 shows of the components present in the interior of an unmanned ground-based transport vehicle shown in FIGS. 6 and 7.
Figure 16:
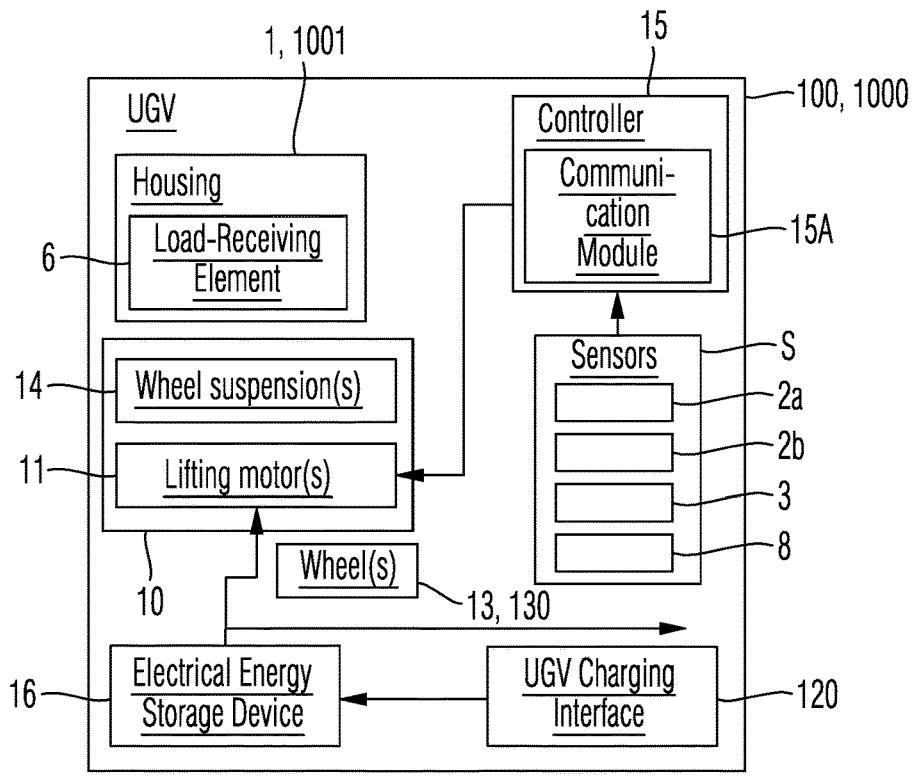
FIG. 16 schematically illustrates a functional block diagram of unmanned ground-based transport vehicle according to an embodiment of the disclosure herein.

FIG. 1 shows a schematic perspective view of the exterior of an unmanned ground-based transport vehicle (UGV) 100. FIG. 3 shows a schematic illustration of the components present in the interior of the UGV 100. FIGS. 6 to 8 show a further UGV 1000, wherein FIGS. 6 and 7(A)-7(D) show a schematic perspective view of the exterior of the UGV 1000 and FIG. 8 shows a schematic illustration of the components present in the interior of the UGV 1000. FIG. 16 shows a functional block diagram of an UGV 100, 1000.

As shown for example in FIG. 16, an UGV 100, 1000 may comprise a housing 1, 1001, at least one wheel drive 10, at least one wheel 13, a controller 15, and a plurality of sensors S. Optionally, an electrical energy storage device 16 and an UGV charging interface 120 may be provided, too. The UGV 100, 1000 comprises at least on load-receiving or load-bearing element 6 which is configured to support an item to be transported and which is coupled to the housing 1, 1001 of the UGV 100, 1000. In particular, the load-receiving element 6 may be detachably coupled to the housing, for example, such that it is stationary relative to the housing 1, 1001 in the coupled state. The wheel drive 10 is kinematically coupled to the at least one wheel 13, 130 and configured to drive the wheel 13, 130 in order to move the UGV 100, 1000 on a transport surface. Further, the wheel drive 10 may be configured to deflect the at least one wheel 13, 130 so that the housing 1, 1001 can be lifted together with the load-bearing element 6 in order to lift an item supported by the load-receiving element 6.

As can be taken from FIG. 16, the wheel drive 10 may include at least one wheel suspension 14 and at least one lifting motor 11. Generally, each wheel 13, 130 may be coupled to an individual wheel suspension and one or more lifting motors 11 may be provided per wheel 13, 130. Operation of the wheel drive 10 may be controlled by controller 15, for example, based on sensor data captured by sensors S. The controller 15, the lifting motors 11, and, as far as necessary, the sensors S may be supplied with electrical energy from the electrical energy storage device 16, which may, for example, be a battery, an accumulator, or similar. The electrical energy storage device 16 may be charged via the UGV charging interface 120.

The controller 15 may comprise, for example, an ASIC, an FPGA or any other suitable computing device(s) or processor. The controller 15 serves to control and monitor the wheel drive, sensors and other electronic or electrical components of the UGV 100.

The sensors S may, for example, include a pyroelectric sensor 3 that provides information about nearby heat sources and that can thus be used to protect human workers in the vicinity of the UGV. Other sensors, in particular environmental sensors for capturing information about the surrounding of the UGV, such as, for instance, radar sensors, ultrasonic sensors, optical sensors, IR sensors, laser sensors, lidar sensors or other types of sensors may be provided at different positions and in different arrangements on the UGV 100, 1000. Without limitation of the universality, sensors 2a and 2b are shown in FIG. 16. Further optionally, an inclination sensor 8 may be provided. The sensors for environment sensing advantageously may also be used for navigation purposes. For example, the controller 15 may receive the sensor data from the environment sensors and control operation of the wheel drive based on the captured sensor data. Further, the environment sensors may capture an assembly progress of a product in an assembly line. For example, during transport of items in an assembly line, the sensors may capture information representing an assembly state of a product to be assembled. Optionally, bar codes attached to the already assembled items may be read by the sensors and/or an image recognition algorithm may determine from captured images which items of the product are already assembled. The UGV 100 may transmit the captured or determined assembly progress to a central control system, e.g. a server (not shown), and receive from the central control system a notification which item is to be transported next. Additionally, or alternatively, a sensor module (not shown) may be transported on the load receiving element 6 as an item, the sensor module being equipped with a sensor system configured to capture the assembly progress and/or configured to capture quality indicators of the product.

An UGV 100, 1000 may be used alone or in combination with at least one further UGV 100, 1000 for performing transportation tasks. Since each UGV 100, 1000 comprises sensors S, each UGV 100, 1000 may navigate autonomously. When used in combination with other UGVs 100, 1000, each UGV 100, 1000 may be equipped with an individual load-receiving element 6 in order to easily couple with an interface of the item to be transported. Of course, all UGVs 100, 1000 may also be equipped with the same type of load-receiving element 6. Optionally, sensor information captured by the UGVs 100, 1000 may be shared between UGVs 100, 1000 which together transport an item, for example, via a wireless communication module 15A of the controller 15. This helps the UGVs 100, 1000 in autonomous navigation, in particular, when large items are transported and when the environment sensors of one or more of the UGVs 100, 1000 are at least partially shadowed by the item.

The UGV 100, 1000 may be used for transport tasks in assembly lines, in particular, in a final assembly line of aircrafts. Due to its outstanding maneuverability, for example, because of employing omnidirectional wheels 13, 130, the UGV 100, 1000 can easily navigate within the fuselage of an aircraft which is assembled. Similar, the UGV 100, 1000 may be used in the assembly of other large products, such as ships, trains, or general in material supply of production lines. Further use cases may be loading and unloading of vehicles. Of course, other use cases of the UGV 100, 1000 are possible, too. For example, the UGV 100, 1000 may perform transportation tasks in indoor environments, such as in warehouses, supermarkets, offices, laboratories, hospitals, and so on, or in outdoor environments, such as airports, train stations, harbours, mines, and so on.

As shown for example in FIGS. 1 through 4(B), essentially, the UGV 100 comprises a housing 1, having a base plate 1c, and at least one housing side wall 1a that is substantially perpendicular to the base plate 1c. The housing 1 may have, for example, a substantially box-shaped structure, possibly having rounded corners, on the other side faces, i.e. on the side walls that complete the housing 1 to form a closed enclosure for the internal components. Arranged in the recess 1d in the floor plate 1c there is a wheel 13, which is suspended inside the UGV 100, for example by a wheel suspension 14 having two suspension arms 14A, 14B.

The wheel 13 may be, for example, an omnidirectional wheel such as, for instance, a so-called Mecanum or lion wheel, which has a number of barrel-shaped rollers mounted rotatably on the circumference of the wheel 13 at an angle of inclination in relation to the main axis of rotation of the wheel 13. The rollers provide contact with the ground or transport surface. The rollers can rotate freely about the inclined bearing axis. The wheel 13 as such is driven via a wheel drive 10 inside housing 1 with variable direction of rotation and variable rotational speed. Depending on the selected direction of rotation and rotational speed, the omnidirectional wheel 13 can move in all directions, parallel to the plane of the floor.

Alternatively, however, for this purpose it may be possible to realize the wheel 13 as an individually steered wheel having a controllable rotary suspension for rotating the wheel running axle perpendicular to the ground. For example, the wheel 13 may be integrated as a drive wheel into a travel/turn module which, in addition to the rotary movement of the drive wheel, also permits an additionally active vertical axis rotation capability and alignment. The wheel drive in this case may have two separate drive motors, one of which drives the drive wheel of the travel/turn module, while the other effects its alignment about the vertical axis. The capability to rotate about the wheel running axle and the vertical axis is endless in each case, and thus enables continuous movement of the wheels without end positions. Alternatively, to implement omnidirectional mobility of the UGV 100, the wheel 13 may also be realized as an all-side wheel, i.e. as a wheel attached to the main circumferential surface of which are a number of auxiliary wheels, the axes of rotation of which are at right angles to the main axis of rotation of wheel 13.

The UGV 100 may comprise a plurality of sensors for environment sensing. For example, attached to the top of the housing 1 there may be pyroelectric sensor 3 that provides information about nearby heat sources and that can thus be used to protect human workers in the vicinity of the UGV. Other sensors such as, for instance, radar sensors, ultrasonic sensors, optical sensors, IR sensors, laser sensors, lidar sensors or other types of sensors may be integrated into the housing 1 of the UGV 100 at different positions and in different arrangements. Without limitation of the universality, sensors 2a and 2b are represented, as examples, on different side walls of the UGV 100 in FIGS. 1 through 4(B).

The UGV 100 may comprise a controller 15 for autonomous location and navigation of the UGV 100 on the basis of sensing parameters of the plurality of sensors. The controller 15 may comprise, for example, an ASIC, an FPGA or any other suitable computing device(s) or processor. The controller 15 serves to control and monitor the wheel drive, sensors and other electronic or electrical components of the UGV 100.

Figure 2:
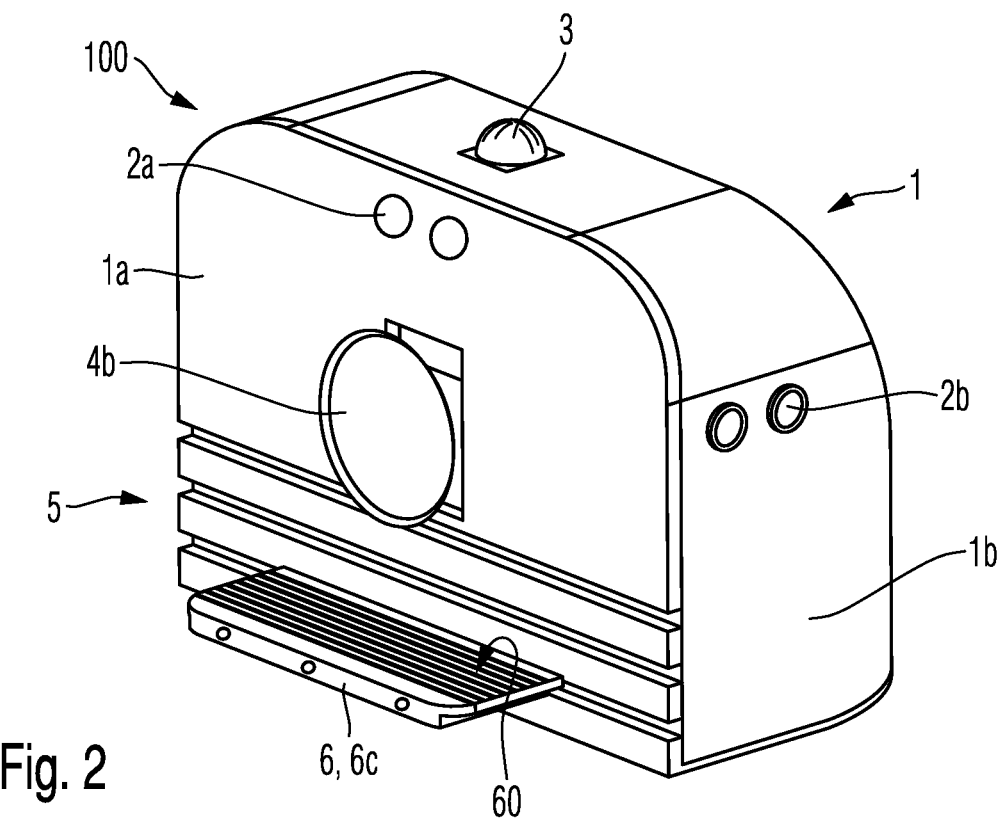
FIG. 2 shows a schematic perspective view of the exterior of an unmanned ground-based transport vehicle according to a further embodiment of the disclosure herein.
Figure 12:
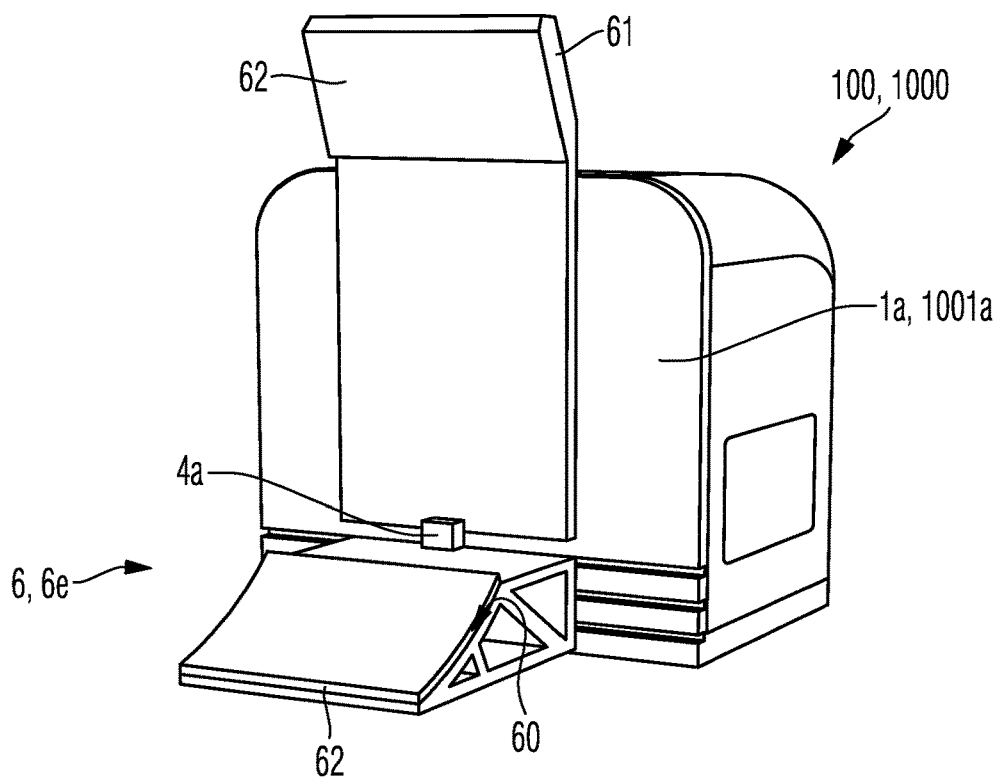
FIG. 12 shows a schematic perspective view of the exterior of an unmanned ground-based transport vehicle according to a further embodiment of the disclosure herein.

In one of the housing side walls 1a—shown facing forwards in FIGS. 1 and 2—there may be one or more grooves 5, running parallel to the base plate 1c. These grooves 5 serve to receive one or more load-receiving elements 6. FIG. 1 shows two load-receiving elements 6a, 6b, each representing outwardly projecting load-receiving forks 6a and 6b. In FIG. 2, only one load-receiving element 6 is shown, as a widened load-receiving platform or plate 6c. The load receiving elements 6a, 6b, 6c each comprise a substantially even support surface 60 in order to support an item with respect to a vertical direction extending perpendicular to the base plate 1c. FIG. 12 shows for example a load-receiving element 6 in the form of a substantially wedge shaped component 6d protruding outwardly from the housing side wall 1a. The wedge shaped component 6d may comprise a concave curved support surface 60 which extends outwardly from and inclined relative to the housing side wall 1a. Thus, the support surface 60 of the wedge shaped component 6d is configured to support an item with respect to the vertical direction. Optionally, a counterpart 61 may be coupled to the housing side wall 1a, 1001a in addition to the wedge shaped component 6d. As shown for example in FIG. 12, the counterpart 61 may extend in the vertical direction along the housing side wall 1a, 1001a and include a concave curved end section arranged opposite to the support surface 60. Such a configuration may be advantageously used for lifting and transporting of a pipe P as is shown for example in FIG. 14. Generally, the at least one load-receiving element 6 of the UGV 1, 1001 may comprise a load support surface 60 for supporting an item with respect to a vertical direction which extends transverse to the base plate 1c, 1001c.

As is further shown in FIGS. 1, 2 and 12, the load-receiving elements 6a, 6b, 6c may have anti-slip features provided at the load receiving surface 60, e.g. an anti-slip material 62 (FIG. 12) and/or fluted profiles (FIGS. 1 and 2). It may also be possible to tilt or incline the load-receiving elements 6 relative to the horizontal, in order to compensate height differences between the load support of different UGVs.

The grooves 5 may be, for example, T-profile or dovetail grooves 5, in which T-profile or dovetail tongue rails of the respective load-receiving elements 6a, 6b, 6c can engage in a form-fitting manner. For this purpose, the tongue rails can be pushed into the grooves 5 from the outside. The grooves 5 may run parallel to the base plate 1c and at different distances from the base plate 1c, parallel to each other, to enable different load bearing heights to be flexibly adapted to the cargo to be transported. Generally, the at least one load-receiving element 6 is detachably coupled to the housing side wall 1a. In particular, the at least one load receiving element 6 may be coupled to the housing side wall 1a so as to be stationary relative to the base plate 1c, at least with respect to the vertical direction.

A tool carrier 4a may also be arranged in the housing side wall 1a. The tool carrier 4a, optionally, may have an electrical tool connection, i.e. for the purpose of supplying electrical power, the connection may be connected, via electrical lines, to an electrical energy storage device 16 such as, for instance, a battery or accumulator, inside housing 1. The electrical energy storage device 16 may also provide an independent power supply for the other electrical and electronic components of the UGV 100. The tool carrier 4a may be movable in the vertical direction relative to the base plate 1c, e.g. by a carrier lift motor (not shown) kinematically coupled to the tool carrier 4a.

Figure 9:
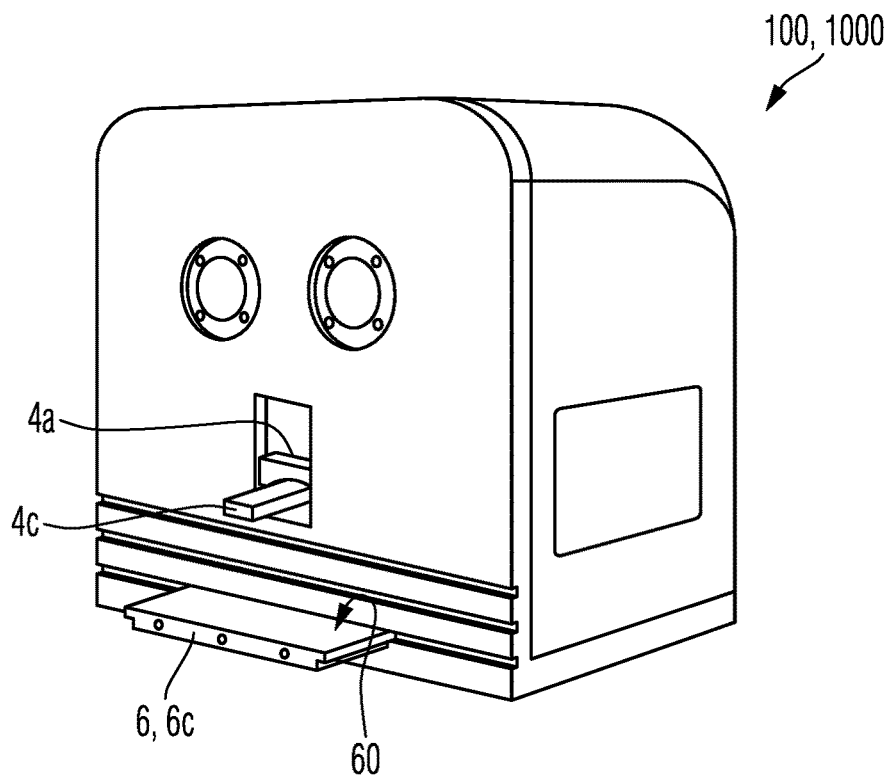
FIG. 9 shows a schematic perspective view of the exterior of an unmanned ground-based transport vehicle according to a further embodiment of the disclosure herein.
Figure 10:
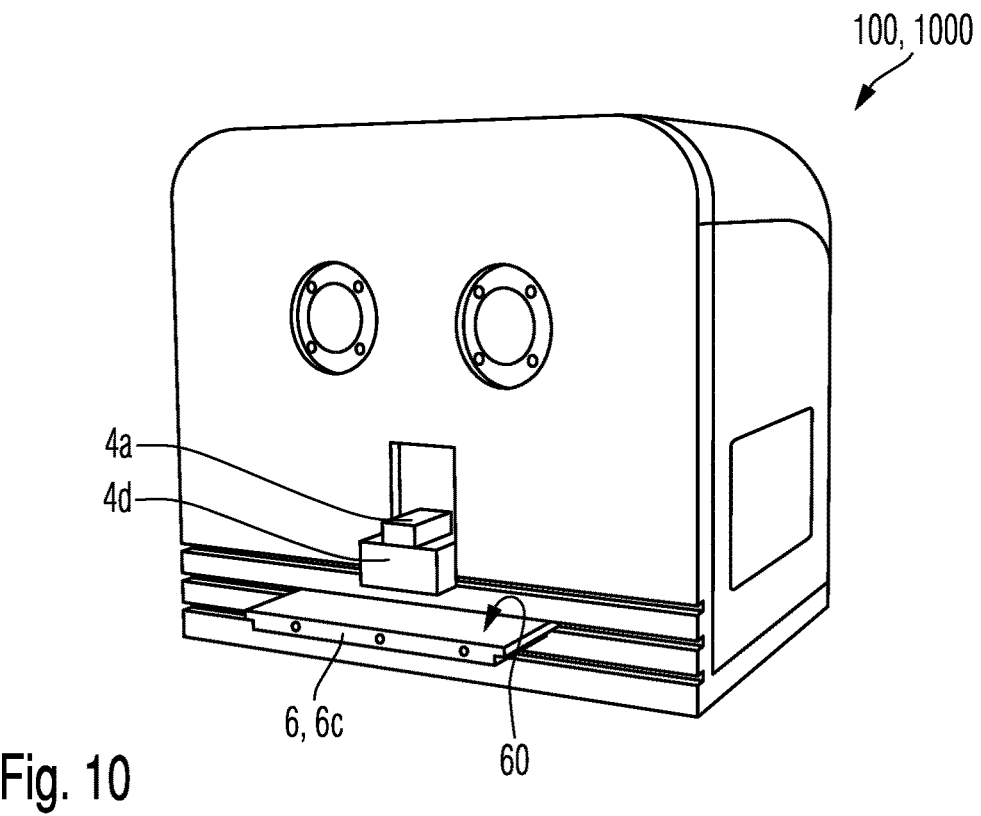
FIG. 10 shows a schematic perspective view of the exterior of an unmanned ground-based transport vehicle according to a further embodiment of the disclosure herein.
Figure 11:
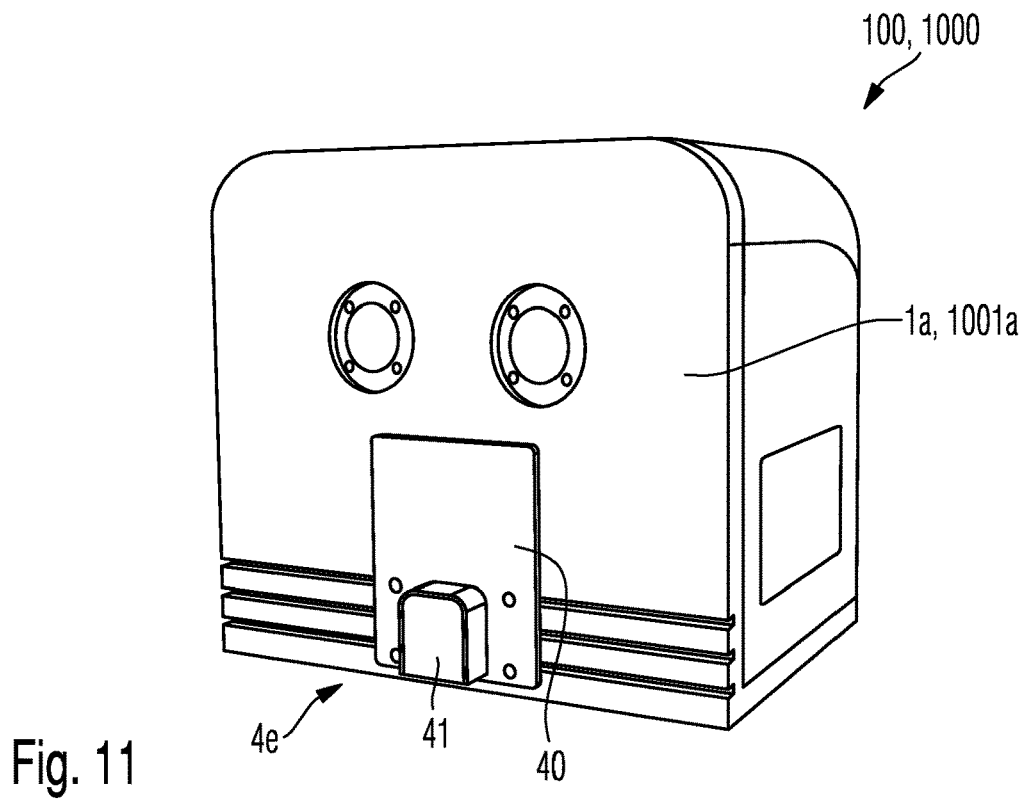
FIG. 11 shows a schematic perspective view of the exterior of an unmanned ground-based transport vehicle according to a further embodiment of the disclosure herein.

A great variety of tools may be attached to the tool connection. FIG. 2, by way of example, illustrates an electrically operated suction pad 4b, which is connected to the electrical tool connection. The suction pad 4b may be, for example, a vacuum suction pad that rests against a flat outer surface of the cargo to be transported and that enables improved handling of the cargo by a vacuum between the suction surface and the outer surface. FIG. 9 shows for example a horizontal stop 4c coupled to the tool carrier 4a, which may be pivotal about an axis extending in the vertical direction. The stop 4c may be used to support an item to be transported with respect to direction parallel to the base plate 1c, 1001c. FIG. 10, by way of example, shows a vertical stop or clamp element 4d coupled to the tool carrier 4a. The clamp element 4d may serve for clamping an item between the clamp element 4d and the support surface 60 of the load-receiving element 6. FIG. 11 shows for example a magnet interface 4e coupled to the housing side wall 1a, 1001a. The magnet interface 4e may include a carrier plate 40 mechanically coupled to the side wall 1a, 1000a and a magnet device 41, in particular an electromagnet, coupled to the tool carrier 4a. The carrier plate 40 may be detachably coupled to the side wall 1a, 10001, for example, by the T-profile or dovetail groove 5 in the same fashion as described above for the load-receiving element 6. The magnet device 41 may be mechanically and/or electrically coupled to the tool carrier 4a. Thus, the magnet device 41 can be activated, e.g. supplied with electrical energy by the tool carrier 4a, and, optionally, be moved relative to the carrier plate 40, in particular in the vertical direction, by the tool carrier 4a. Further, FIG. 12, by way of example, shows the counterpart 62 to be coupled to the tool carrier 4a. Further examples for tools may include manipulators, for example, manipulator arms which enable manipulation of the items, for example, gripping and rotating of the items.

Figure 4A:
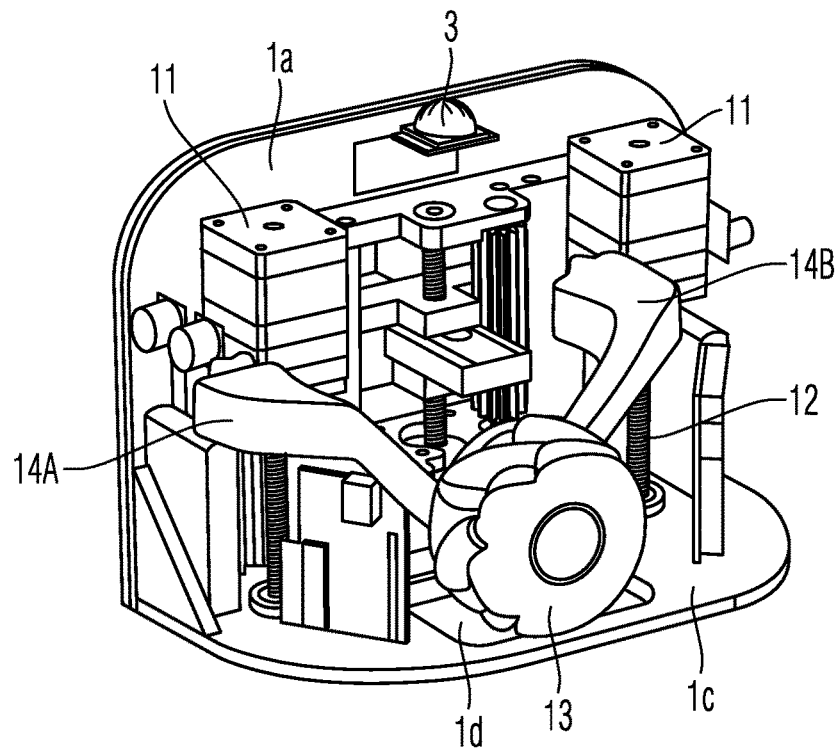
FIGS. 4(A) and 4(B) show schematic illustrations of two operating states of the unmanned ground-based transport vehicle of FIG. 3 during the raising of loads to be transported.
Figure 4B:
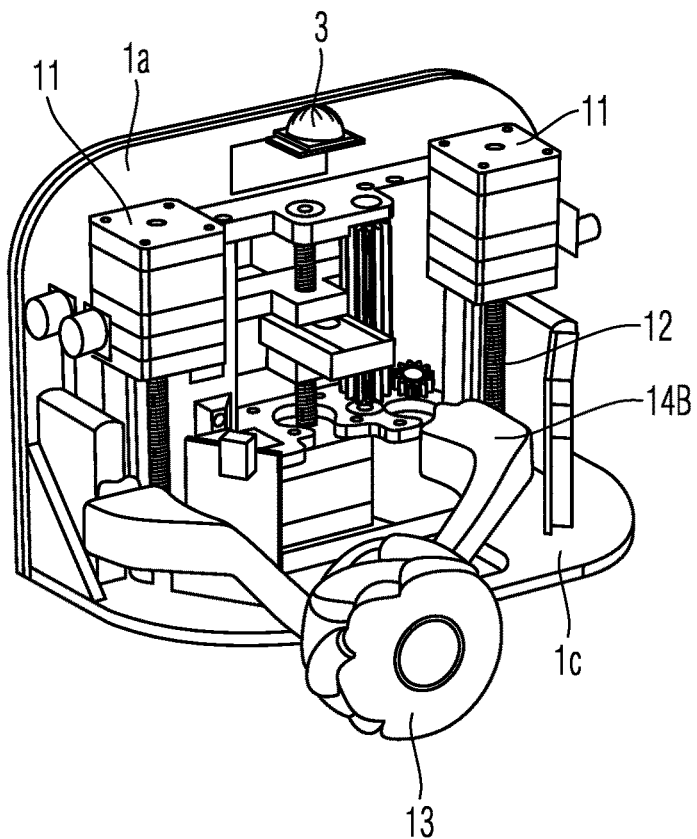

As shown for example in FIGS. 3 and 4(A)-4(B), two lifting motors 11 may be provided inside housing 1, to enable the cargo or item to be raised after the cargo has been loaded onto the load-receiving elements 6. These lifting motors 11 are configured to deflect the wheel suspension arms 14A, 14B, relative to the housing 1, in a direction perpendicular to the base plate 1c, that is, in the vertical direction. For example, the wheel suspension arms 14A, 14B may be connected to the housing 1 via two sawtooth-threaded rods 12 coupled to the two lifting motors 11, such that the lifting motors 11 can shift the wheel suspension arms 14 up or down along the course of the sawtooth-threaded rods 12, and thus retract or extend the omnidirectional wheel 13 from the recess 1c. The lifting motors 11 may be electric motors such as, for example, stepper motors or servo motors. The UGV 100 shown for example in FIGS. 1 through 4(B) comprises exactly one wheel 13. One wheel drive 10 is provided for this wheel 13, including one wheel suspension 14 and two lifting motors 11. Generally, also for the case that more than one wheel is provided, the wheel drive 10 may comprise at least one wheel suspension 14 per wheel and at least one lifting motor 11 per wheel, wherein each lifting motor 11 is kinematically coupled to one wheel so as to deflect the wheel relative to the housing in the vertical direction.

Two possible operating states of the lifting motors 11 are represented in scenarios 4(A) and 4(B)—firstly, in 4(A), the wheel suspension 14 is located at the upper end of the sawtooth-threaded rods 12, such that the omnidirectional wheel 13 is completely, or almost completely, accommodated inside the housing 1, i.e. the distance of the base plate 1c from the floor is zero, or at least very small. Following actuation of the lifting motors 11, the wheel suspension 14 is moved downwards along the sawtooth-threaded rods 12 by rotational movement, such that the omnidirectional wheel 13 moves out of the recess 1d, downwards out of housing 1, and thus the entire housing 1 is raised from the floor until the full lifting height is attained, in FIG. 4(B).

The controller 15 of the UGV 100 may include a wireless communication module 15A (FIG. 16), via which the controller 15 of a first UGV 100 can exchange data with a controller 15 of a second UGV 100. In particular, different UGVs 100 may each be designated as a lead vehicle ("master") or follower vehicle ("slaves"), such that the controller 15 of the lead vehicle is connected to the controller 15 of the follower vehicles via wireless communication, and can control and monitor the movements of the follower vehicles. For example, sensor data captured by the sensors S may be shared between the UGVs 100 via the wireless communication module 15A.

This may advantageously be used in a method for transporting cabin monuments, which for example may use a cooperatively acting swarm of UGVs 100. In this case, firstly, at least three UGVs 100—e.g. UGVs 100 as represented and explained in FIGS. 1 through 4(B)—are distributed around the outer circumference of a cabin monument. Preferably, four UGVs, each having one wheel, are arranged in a specially arranged constellation in relation to the payload. The cabin monument is placed in a suitable manner on the load-receiving elements of the UGVs 100, such that the cabin monument can be raised in a coordinated movement by the lifting motors 11 of the UGVs 100. The cabin monument, raised thus, can then be moved by cooperative control of the omnidirectional wheels 13 of the at least three UGVs 100, for example within a final assembly line, from a delivery point to a final assembly position.

In the cooperative movement of the UGVs, one of the at least three UGV 100s may assume the role of lead vehicle. The controller 15 of the lead vehicle communicates, via wireless communication, with the controller 15 of the other UGVs 100, and can issue movement commands to the follower vehicles.

Figure 5A:
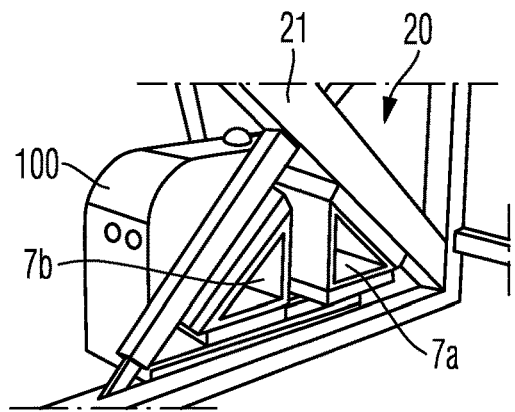
FIGS. 5(A), 5(B) and 5(C) show schematic illustrations of three load receiving situations of unmanned ground transport vehicles during the raising of cabin monuments.
Figure 5B:
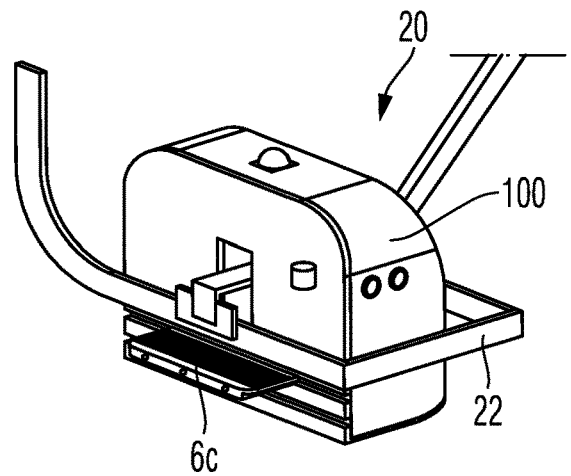
Figure 5C:
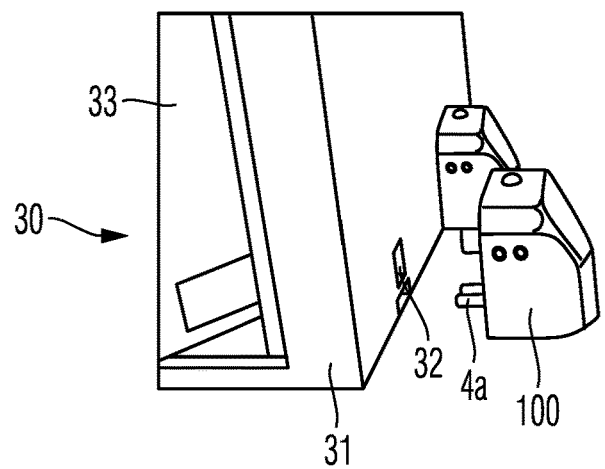

Represented in FIG. 5(A)-5(C) are schematic illustrations of three load receiving situations of UGVs 100 during the raising of cabin monuments. In FIG. 5(A), a UGV 100 may raise a passenger seat assembly 20. For this purpose, support wedges 7a and 7b, each having anti-slip materials on its sloping surfaces, may be placed on the load-receiving elements, or on the load-receiving element of the UGV 100. The UGV 100 can thus also receive sloping undersides such as, for instance, cross-members 21 of a passenger seat assembly 20, in a straight line and without tipping.

In FIG. 5(B), another UGV 100 receives the passenger seat assembly 20 on a load-receiving platform 6c. No further support wedges are necessary here, since the underside of the passenger seat assembly 20 has a straight mounting bar 22 at this point.

In the case of toilet assemblies 30, the tool connection of the tool carrier 4a of a UGV 100 may be used—as shown as an example in FIG. 5(C)—to engage in connection interfaces 32 in a side wall 31 of a toilet assembly 30 having a toilet door 33, and to supply it with electrical supply signals. This allows, for example, the functionality of the assembly to be controlled during transport and checked if necessary.

Figure 13:
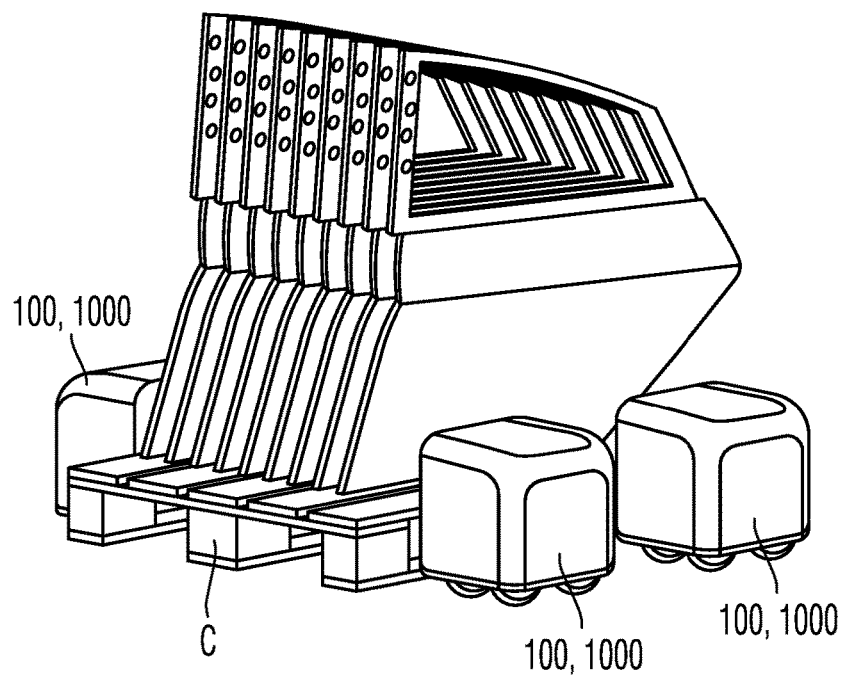
FIG. 13 shows a schematic illustration of a load receiving situation of unmanned ground transport vehicles during the raising of a pallet.
Figure 14:
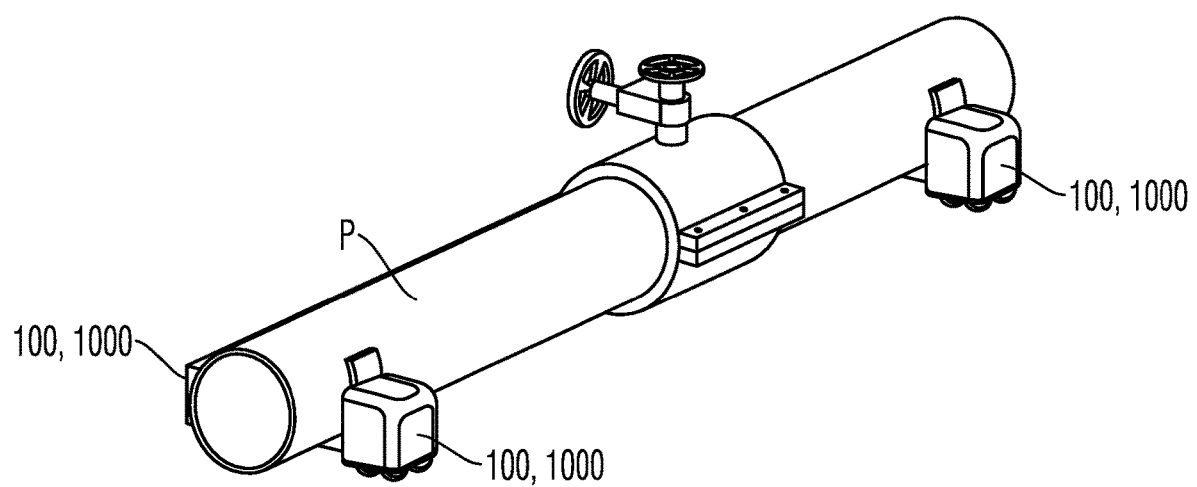
FIG. 14 shows a schematic illustration of a load receiving situation of unmanned ground transport vehicles during the raising of a pipe.

Of course, the above described method is not limited to transporting cabin monuments of an aircraft. As shown for example in FIGS. 13 and 14, other items may be transported in accordance with this method. FIG. 13 shows for example a palette C being lifted and transported by four UGVs 100, 1000 (only three visible in FIG. 13). On the palette C, items may be loaded, such as doors for vehicles, as shown for example in FIG. 13. FIG. 14 shows for example using the above described method for lifting and transporting a pipe P by four UGVs 100, 1000 (only three visible in FIG. 14).

FIGS. 6 through 8 show an embodiment 1000 of a UGV that has an arrangement of four wheels 130. The mobility of the UGV 1000 in all directions results from the fact that a UGV 1000 has four specially arranged Mecanum wheels. It may also be possible to provide the UGV with individually steered wheels having a controllable rotary suspension for rotating the wheel running axle perpendicular to the ground.

Generally, the UGV 100 may comprise four omnidirectional wheels. The essential elements and the mode of operation of the UGV 1000 are essentially the same as those of the UGV 100 described in connection with FIGS. 1 to 5, with a housing 1001, having a base plate 1001c and at least one housing side wall 1001a substantially perpendicular to the base plate 1001c, being likewise provided. On the rest of the side surfaces, i.e. on the side walls that complete the housing 1000 to form a closed enclosure for the internal components, the housing 1000 may have, for example, a substantially box-shaped structure, possibly having rounded corners. Arranged in the recess or recesses 1001d of the base plate 1001c are four wheels 130, which are suspended by wheel suspensions 14 inside the UGV. Such a design is advantageous, for example, if the load of the item to be transported is transferred to the transport surface not only via one wheel of the UGV, but via a plurality of wheels, and thus a plurality of load application points. This can be advantageous, in particular, if the transport surface is also the floor plate of an aircraft, and this surface should not be subjected to excessive loads.

In FIGS. 7(A)-7(D), it is shown that the wheels 130 can be lowered or retracted by lifting motors. It is possible in this case to arrange them on two axles, but the wheels may also be controlled, or raised and lowered, individually, for example by aid of the wheel suspension 14 provided for each wheel. FIGS. 7(A)-7(D) show various operating states. Thus, FIG. 7(A) shows retracted wheels 130, FIG. 7(B) shows the wheels 130 extended, and FIGS. 7(C) and 7(D) show either the front or the rear wheels 130 retracted when, at the same time, the wheels 130 on the other axle are extended. Such axle wise or wheel wise raising or lifting of the wheels 130 may be advantageous when passing uneven portions of a floor or transport surface, e.g. when passing a sill or gap. In particular, the lifting motors 11 coupled to the wheels may be controlled so as to keep the base plate 1001c basically horizontal. As is schematically shown in FIG. 16, the UGV 1000 may comprise an inclination sensor 8 configured to capture an inclination of the base plate 1001c relative to a predefined reference direction, i.e. the direction of gravity. For example, the inclination sensor 8 may include three electronic acceleration sensors which measure an acceleration along three perpendicular axes. The controller 15 of the UGV 1000 receives the measured or captured inclination of the base plate 1001c and controls the lifting motors 11 coupled to the wheels 130 such that of the base plate 1001a relative to the reference direction is kept within a predefined range. Optionally, when a swarm of cooperatively controlled UGVs 1000 is used to transport an item, the UGVs 1000 may communicate the inclination of their base plates to each other and further a lifting value of each of their wheels 130, wherein the controller 15 of the lead UGV is configured to issue control commands to each UGV 1000 of the swarm of UGVs 1000 for controlling the lifting motors 11 of each UGV 1000 such that an inclination of the item relative to the reference direction, which results from its contact with the load-receiving elements 6 of the UGVs 1000, is kept within a predefined range.

FIG. 8 shows a detailed view of the interior of the UGV 1000. Inside the housing 1001, the drive mechanism or wheel drive 10 and the lifting and lowering mechanism or wheel suspensions (not visible in FIG. 8) are arranged in a compact design. Also provided are energy storage devices, which enable the UGV 1000 to move independently.

As disclosed above, various items can be transported by a method using a cooperatively acting swarm of UGVs. This method can be carried out by all types of UGVs 100, 1000 described above, irrespective of the number of wheels 13, 130. When UGVs 1000 having more than one wheel 130 are used, at least two UGVs 1000—e.g. UGVs 100 as represented and explained in FIGS. 6 to 8 or 9 to 12—are distributed around the outer circumference of an item, for example a cabin monument. The item is placed in a suitable manner on the load-receiving elements 6 of the UGVs 1000, such that the cabin monument can be raised in a coordinated movement by the lifting motors 11 of the UGVs 1000. In particular, the wheels 13 are deflected relative to the base plate 1001c in the vertical direction. The item, raised thus, can then be moved by cooperative control of the omnidirectional wheels 130 of the at least two UGVs 1000, for example within a final assembly line, from a delivery point to a final assembly position.

Figure 15:
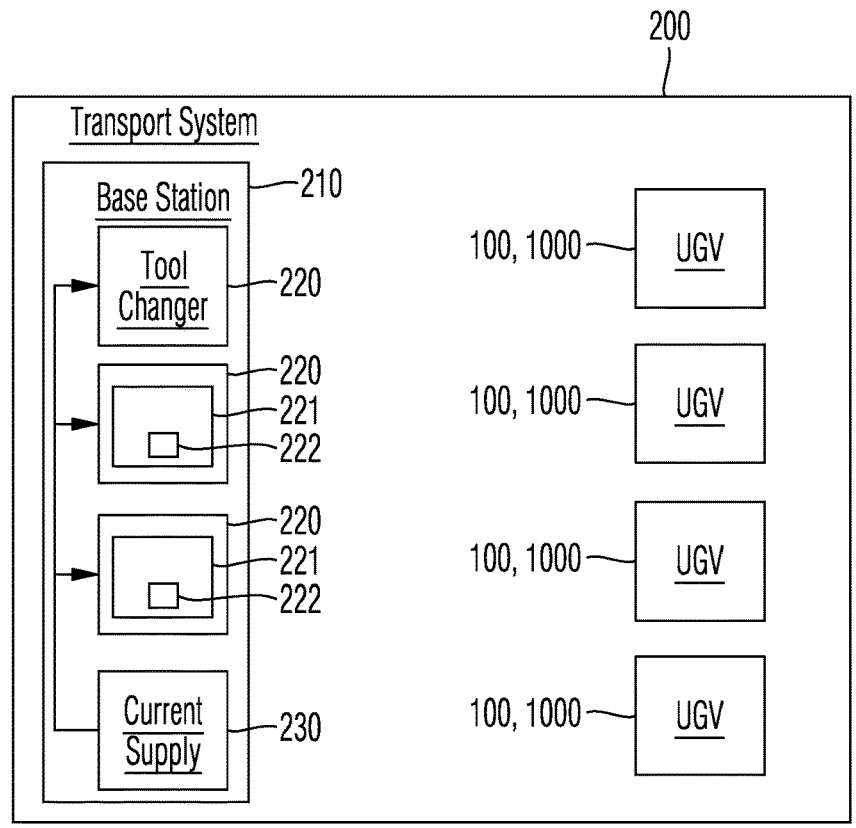
FIG. 15 schematically illustrates a functional block diagram of a transportation system according to an embodiment of the disclosure herein.

A method as described above, for example, may be carried out by an unmanned transport system, UTS, 200 including two or more UGVs 100, 1000. FIG. 15 schematically shows an UTS 200 comprising four UGVs 100, 1000 and a base station 210. Of course, other more or less than four UGVs 100, 1000 may be provided. The UGVs 100, 1000 may be configured as described above. The base station 210 may comprise an electrical current supply 230, at least one electrical charging interface 220 for charging the UGVs 100, 1000, and an optional tool changer 240.

The charging interfaces 230 may comprise a charging plate 221, onto which the UGV 100, 1000 can drive and park, and a charging inductor coil 222 arranged beneath the charging plate 221 or integrated into the charging plate 221. The charging interfaces 220 are electrically connected to the current supply 230 of the base station 210. Optionally, a controller (not shown) may be provided for controlling operation of the charging interfaces 230.

The UGV 100, 1000 may comprise an UGV charging interface 120 which is only schematically shown in FIG. 16. Generally, the UGV charging interface 120 is configured for being connected to the charging interfaces 230 of the base station 220. Optionally, the UGV charging interface 120 is configured for being autonomously connected to the charging interfaces 230 of the base station 220. For example, the UGV charging interface 120 may comprise a receiving inductor coil (not shown) arranged on or integrated into the base plate 1c, 1001d of the housing the UGV charging interface 120. For charging the electrical energy storage device 14, the UGV may simply drive onto the charging plate of the base station. Thus, charging can be performed autonomously in a very simple manner.

The optional tool changer 220 may include a magazine holding various tools, for example, suction pads 4b (FIG. 2), stop elements 4c (FIG. 9), clamp elements 4d (FIG. 10), magnet interfaces 4e (FIG. 11), counterparts 62 (FIG. 12), and so on. An UGV 100, 1000 of the transport system 200 may autonomously drive to the tool changer 220 and couple the respective tool to its tool carrier.

In the preceding detailed description, various features have been combined in one or more examples to improve the stringency of the presentation. It should be clear in this case, however, that the above description is merely illustrative, and is in no way restrictive. It serves to cover all alternatives, modifications and equivalents of the various features and example embodiments. To persons skilled in the art, because of their technical knowledge, many other examples will be immediately and directly obvious upon consideration of the above description.

The example embodiments have been selected and described in order to best illustrate the principles underlying the disclosure herein and its possible applications in practice. This enables experts to modify and use the disclosure herein and its various examples of execution in an optimal manner with respect to the intended purpose. In the claims, as well as in the description, the terms "including" and "having" are used as neutral language terms for the corresponding terms "comprising". Furthermore, use of the term "one" is not in principle intended to exclude a plurality of such described features and components.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An unmanned ground-based transport vehicle (UGV), comprising:
    a housing having a base plate and at least one housing side wall that is substantially perpendicular to the base plate;
    at least one wheel drive in the housing, wherein the wheel drive comprises at least one wheel suspension and at least one lifting motor;
    at least one wheel coupled to the at least one wheel drive and in a recess in the base plate, wherein each wheel is suspended on one wheel suspension, and wherein the at least one lifting motor is provided for each wheel, each lifting motor being kinematically coupled to one wheel to deflect the wheel relative to the housing in the vertical direction;
    a plurality of sensors for sensing an environment of the UGV;
    a controller for autonomous location and navigation of the UGV based on sensing parameters of the plurality of sensors; and
    at least one load-receiving element coupled to the housing side wall and extending outwards from the housing side wall, the at least one load-receiving element comprising a load support surface for supporting an item with respect to a vertical direction which extends transverse to the base plate.

2. The UGV according to claim 1, wherein the at least one load-receiving element extends substantially parallel to the base plate.

3. The UGV according to claim 1, wherein the at least one load-receiving element is coupled to the housing side wall to be stationary relative to the base plate, at least with respect to the vertical direction.

4. The UGV according to claim 1, wherein the at least one load-receiving element is detachably coupled to the housing side wall.

5. The UGV according to claim 4, wherein the at least one housing side wall comprises at least one T-profile or dovetail groove, which extends parallel to the base plate and is configured to receive a T-profile or dovetail tongue rail of the at least one load-receiving element in a form-fitting manner.

6. The UGV according to claim 1, wherein a tool carrier, having an electrical tool connection, is in the at least one housing side wall.

7. The UGV according to claim 6, further comprising an electrically operable suction pad connected to the electrical tool connection.

8. The UGV according to claim 1, wherein the at least one wheel suspension comprises two wheel suspension arms connected to the housing via two sawtooth-threaded rods coupled to two lifting motors provided for the wheel.

9. The UGV according to claim 1, wherein the UVG comprises at least two wheels and an inclination sensor configured to capture an inclination of the base plate relative to a predefined reference direction that is a direction of gravity, wherein the controller is configured to control the lifting motors coupled to the wheels such that inclination of the base plate relative to the reference direction is kept within a predefined range.

10. The UGV according to claim 1, wherein the UGV comprises exactly four wheels, which are coupled to four wheel drives, each wheel being in one recess in the base plate.

11. The UGV according to claim 1, wherein the UGV comprises exactly one wheel, which is coupled to the wheel drive and in the recess in the base plate.

12. The UGV according to claim 1, wherein the controller comprises a wireless communication module, via which the controller of one UGV is configured to exchange data with a controller of another UGV.

13. An unmanned transport system comprising a plurality of UGVs according to claim 12, one of the plurality of UGVs performing a role of a lead vehicle, and a controller of the lead vehicle being connected to controllers of a rest of the plurality of UGVs via wireless communication, and being configured to control movements of the rest of the plurality of UGVs.

14. The unmanned transport system according to claim 13, further comprising a base station including an electrical charging interface, wherein the UGVs comprise an electrical energy storage device and an UGV charging interface configured to be coupled to the electrical charging interface of the base station for charging the electrical energy storage device.

15. A method for transporting items by using a cooperatively acting swarm of unmanned ground-based transport vehicles (UGVs), the method comprising:
  distributing at least two UGVs according to claim 1 around an outer circumference of the item;
  raising the item by using the load-receiving elements of the UGVs; and
  moving the raised item by cooperatively controlling the wheels of the at least two UGVs.

16. The method according to claim 15, wherein one of the at least two UGVs performs a role of a lead vehicle, and the controller of the lead vehicle being connected to controllers of a rest of the plurality of UGVs via wireless communication, and being configured to control movements of the at least two other UGVs.

17. The method according to claim 15, further comprising:
  capturing an inclination of the base plate of the housing of each UGV relative to a reference direction by an inclination sensor;
  controlling a deflection of the wheels of each UGV relative to the base plate such that the inclination of the base plate is within a predefined range; and
  cooperatively controlling the deflection of the wheels of all UGVs relative to the base plate such that the base plates of all UGVs are positioned in a common plane.

18. The method according to claim 15, comprising transporting toilet assemblies, passenger seat assemblies or galleys in a final assembly line of an aircraft assembly facility.

* * * * *